United States Patent
Huibers et al.

(10) Patent No.: US 9,065,532 B2
(45) Date of Patent: Jun. 23, 2015

(54) BUMP BUTTON

(75) Inventors: Andrew G Huibers, Sunnyvale, CA (US); David F Lieb, San Francisco, CA (US); Jacob Mintz, San Francisco, CA (US)

(73) Assignee: Google Inc., Mountain View, CA (US)

(*) Notice: Subject to any disclaimer, the term of this patent is extended or adjusted under 35 U.S.C. 154(b) by 543 days.

(21) Appl. No.: 12/859,695

(22) Filed: Aug. 19, 2010

(65) Prior Publication Data

US 2011/0191438 A1    Aug. 4, 2011

Related U.S. Application Data

(63) Continuation-in-part of application No. 12/699,692, filed on Feb. 3, 2010, now abandoned.

(51) Int. Cl.

| | |
|---|---|
| G06F 15/16 | (2006.01) |
| H04B 7/26 | (2006.01) |
| G06Q 20/32 | (2012.01) |
| H04B 5/00 | (2006.01) |
| H04M 1/2745 | (2006.01) |
| H04M 1/725 | (2006.01) |

(52) U.S. Cl.
CPC ............. *H04B 7/26* (2013.01); *H04B 5/0062* (2013.01); *G06Q 20/3278* (2013.01); *H04B 5/0056* (2013.01); *G06F 15/16* (2013.01); *H04M 1/274516* (2013.01); *H04M 1/7253* (2013.01); *G06F 2200/1636* (2013.01)

(58) Field of Classification Search
CPC . G06Q 20/3278; H04B 5/0056; H04B 5/0062
USPC .......................................................... 709/217
See application file for complete search history.

(56) References Cited

U.S. PATENT DOCUMENTS

| | | | | |
|---|---|---|---|---|
| 6,142,369 A | * | 11/2000 | Jonstromer | 235/380 |
| 6,807,564 B1 | * | 10/2004 | Zellner et al. | 709/206 |
| 6,970,183 B1 | * | 11/2005 | Monroe | 348/143 |
| 7,403,116 B2 | * | 7/2008 | Bittner | 340/540 |
| 7,719,422 B1 | * | 5/2010 | Steinmetz et al. | 340/572.1 |
| 8,391,786 B2 | | 3/2013 | Hodges et al. | |
| 2002/0155844 A1 | * | 10/2002 | Rankin et al. | 455/456 |
| 2003/0167207 A1 | * | 9/2003 | Berardi et al. | 705/16 |
| 2003/0171984 A1 | * | 9/2003 | Wodka et al. | 705/14 |
| 2004/0088345 A1 | * | 5/2004 | Zellner et al. | 709/200 |
| 2004/0150521 A1 | * | 8/2004 | Stilp | 340/545.1 |
| 2004/0192383 A1 | * | 9/2004 | Zacks et al. | 455/557 |
| 2004/0201473 A1 | * | 10/2004 | Lee | 340/531 |
| 2004/0203381 A1 | * | 10/2004 | Cahn et al. | 455/41.2 |

(Continued)

FOREIGN PATENT DOCUMENTS

WO    2008/007175 A1    1/2008

OTHER PUBLICATIONS

Smart Card Alliance, "Proximity Mobile Payments: Leveraging NFC and the Contactless Financial Payments Infrastructure", Sep. 2007, Princeton Junction, NJ.

*Primary Examiner* — Imad Hussain
(74) *Attorney, Agent, or Firm* — Troutman Sanders LLP; James E. Schutz; Rusty C. Close

(57) ABSTRACT

A fixed bump button may: (1) report its identification to a server connected to the internet when the button is bumped by a mobile device; and/or (2) emit a beacon signal identifying the button to a mobile device.

10 Claims, 5 Drawing Sheets

(56) References Cited

U.S. PATENT DOCUMENTS

| | | | |
|---|---|---|---|
| 2004/0203638 A1* | 10/2004 | Chan et al. | 455/414.1 |
| 2004/0243519 A1* | 12/2004 | Perttila et al. | 705/75 |
| 2004/0264404 A1* | 12/2004 | Zegelin | 370/328 |
| 2005/0017068 A1* | 1/2005 | Zalewski et al. | 235/380 |
| 2005/0140507 A1* | 6/2005 | Nam et al. | 340/539.13 |
| 2005/0153707 A1* | 7/2005 | Ledyard et al. | 455/456.1 |
| 2005/0222961 A1* | 10/2005 | Staib et al. | 705/64 |
| 2006/0074698 A1* | 4/2006 | Bishop et al. | 705/1 |
| 2006/0125693 A1* | 6/2006 | Recker | 342/458 |
| 2006/0258289 A1* | 11/2006 | Dua | 455/41.3 |
| 2006/0267731 A1* | 11/2006 | Chen | 340/10.1 |
| 2006/0290496 A1* | 12/2006 | Peeters | 340/572.1 |
| 2007/0136102 A1* | 6/2007 | Rodgers | 705/3 |
| 2007/0188323 A1* | 8/2007 | Sinclair et al. | 340/568.1 |
| 2007/0197261 A1* | 8/2007 | Humbel | 455/558 |
| 2007/0222618 A1* | 9/2007 | Randall et al. | 340/573.1 |
| 2007/0290855 A1* | 12/2007 | Nagino et al. | 340/572.1 |
| 2008/0041936 A1* | 2/2008 | Vawter | 235/380 |
| 2008/0201212 A1* | 8/2008 | Hammad et al. | 705/13 |
| 2009/0024770 A1* | 1/2009 | Dubs et al. | 710/18 |
| 2009/0043658 A1* | 2/2009 | Webb et al. | 705/14 |
| 2009/0063312 A1* | 3/2009 | Hurst | 705/30 |
| 2009/0084840 A1* | 4/2009 | Williams et al. | 235/379 |
| 2009/0112630 A1 | 4/2009 | Collins, Jr. et al. | |
| 2009/0144161 A1* | 6/2009 | Fisher | 705/16 |
| 2009/0153342 A1* | 6/2009 | Thorn | 340/669 |
| 2009/0201122 A1* | 8/2009 | Stobbe | 340/3.1 |
| 2009/0253476 A1* | 10/2009 | Pestotnik | 463/9 |
| 2009/0254438 A1* | 10/2009 | Johnson et al. | 705/17 |
| 2010/0040029 A1* | 2/2010 | Doppler et al. | 370/338 |
| 2010/0042493 A1* | 2/2010 | Nino et al. | 705/14.45 |
| 2010/0049615 A1* | 2/2010 | Rose et al. | 705/17 |
| 2010/0075758 A1* | 3/2010 | Balosetti | 463/42 |
| 2010/0082491 A1* | 4/2010 | Rosenblatt et al. | 705/65 |
| 2010/0090865 A1* | 4/2010 | Dasgupta | 340/932.2 |
| 2010/0109914 A1* | 5/2010 | Tieman et al. | 340/991 |
| 2010/0127850 A1* | 5/2010 | Poder | 340/517 |
| 2010/0136913 A1* | 6/2010 | Picquenot et al. | 455/61 |
| 2010/0295943 A1* | 11/2010 | Cha et al. | 348/143 |
| 2010/0311385 A1* | 12/2010 | Hurwitz | 455/404.1 |
| 2011/0060653 A1* | 3/2011 | King et al. | 705/14.58 |
| 2011/0074582 A1* | 3/2011 | Alexis | 340/572.1 |
| 2011/0076941 A1* | 3/2011 | Taveau et al. | 455/41.1 |
| 2011/0076942 A1 | 3/2011 | Taveau et al. | |
| 2011/0126009 A1 | 5/2011 | Camp, Jr. et al. | |
| 2011/0136468 A1* | 6/2011 | McNamara et al. | 455/406 |
| 2011/0164509 A1* | 7/2011 | Wengrovitz | 370/252 |
| 2012/0027196 A1* | 2/2012 | Martin | 379/265.09 |
| 2013/0054390 A1* | 2/2013 | Kerchner et al. | 705/17 |
| 2014/0040120 A1* | 2/2014 | Cho et al. | 705/39 |

* cited by examiner

BUMP BUTTON

RELATED APPLICATIONS

This application is a continuation-in-part of U.S. patent application Ser. No. 12/699,692, "Bump validation", filed on 3 Feb. 2010 and incorporated herein by reference.

TECHNICAL FIELD

The disclosure is generally related to the field of information exchange between fixed and mobile electronic devices.

BACKGROUND

Recently a simple and quick way to exchange information between mobile electronic devices was developed. When people meet, they can bump their smart phones together to rapidly exchange business cards, music playlists, digital photos, money, or other information. The act of bumping tells a device to start information transfer.

Bumps between mobile devices occur when two devices at the same place at the same time indicate their intention to establish a connection for transferring information. Principles for determining when two devices are at "the same place at the same time" are described in U.S. patent application Ser. No. 12/699,692, "Bump validation", filed on 3 Feb. 2010 and incorporated herein by reference.

Bumps may also occur between mobile and fixed devices. If one of the participants in a bump is fixed at a known place, the problem of determining bump location for the fixed device is solved in advance. What are needed, therefore, are fixed bump terminals.

DETAILED DESCRIPTION

Figure 1:
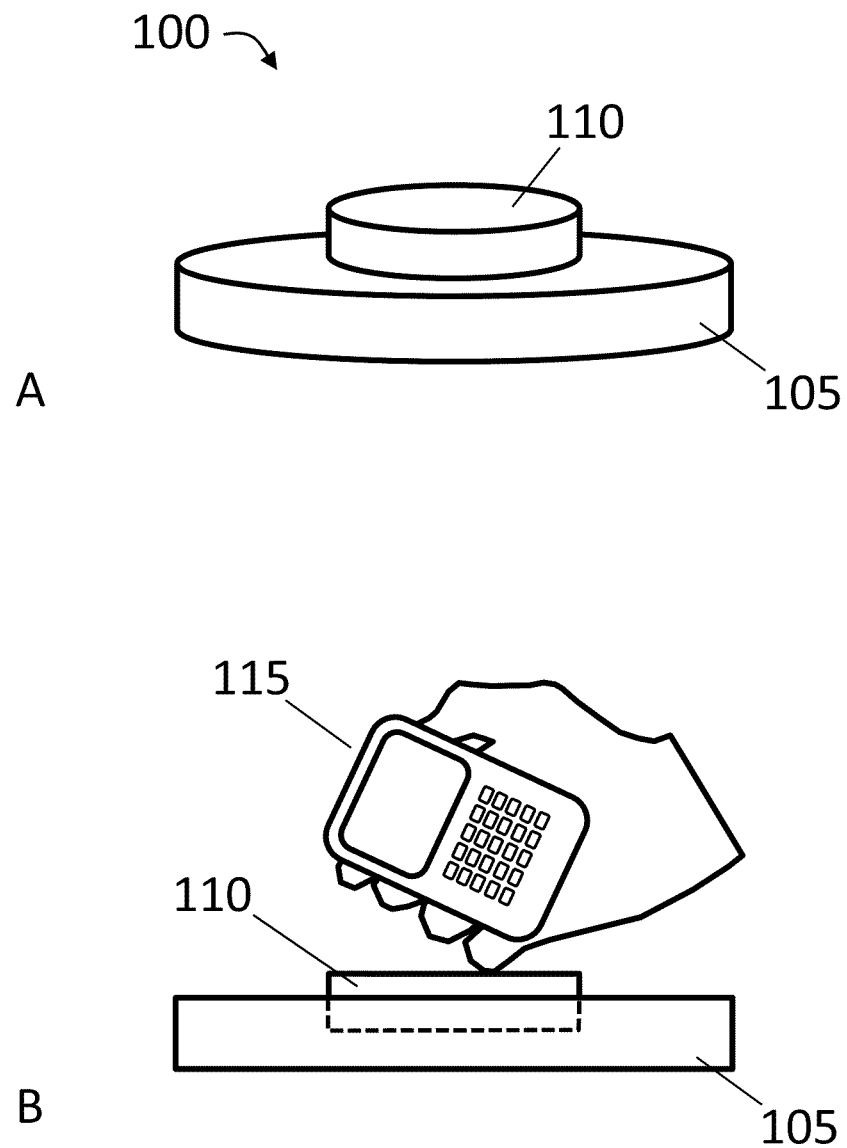
FIG. 1A shows a fixed bump button.
FIG. 1B shows the button of FIG. 1A participating in a bump with a mobile device.

Bumps between electronic devices occur when two devices at the same place at the same time indicate their intention to establish a connection for transferring information. When a mobile device bumps another device that is fixed at a known place, the problem of determining the location of the fixed device is solved in advance.

FIG. 1A shows a fixed bump button 100, an example of a device that may be a fixed participant in a bump. FIG. 1B shows the button of FIG. 1A participating in a bump with a mobile device. In FIGS. 1A and 1B, a bump button includes a fixed base 105 and a button 110. In one configuration, base 105 includes a processor and memory, and an internet connection as described below. The bump button is designed to be placed in a known, fixed location such as a cash register in a shop, an information kiosk in a train station, or fan club booth at a musical concert.

In FIG. 1B, mobile device 115 is bumping the fixed bump button. The act of bumping has depressed button 110 slightly into base 105. When a mobile device (e.g. 115) bumps a fixed bump button (e.g. 100), both devices report their intentions to a server. The mobile device sends a status report including time, position and bump request. The bump button need only send its identification, however. The bump button's location is fixed and already known to the server. Optionally, the button may also send the time of the bump to the server if the button is equipped with a clock.

FIGS. 2A and 2B show examples of bump buttons communicating via the internet. FIG. 2A shows a bump button communicating with the internet via a wireless connection while FIG. 2B shows a bump button communicating with the internet via a wired connection. In FIG. 2A fixed bump button 200 includes a fixed base 205 and a button 210. Base 205 includes a processor and memory. Button 200 also includes a wireless internet connection represented symbolically by antenna 220. The wireless connection may be based on Wi-Fi, Wi-Max, Bluetooth, EDGE, 3 G or 4 G cellular or other radio standards. In FIG. 2B button 200 is shown with a wired internet connection represented symbolically by wires 225. The wired connection may be based on cable television networks, telephone digital subscriber line, ethernet or other wired internet standards.

When a mobile device bumps a fixed bump button, a server receives information from both the mobile device and the fixed button. A few examples serve to illustrate how bump information may be used. In a first example, a bump button is located at the cash register of a retail shop such as a coffee shop, clothing store, supermarket, etc. A customer pays for a purchase by bumping his mobile device (e.g. smart phone, personal digital assistant, etc.) against the bump button. When the bump occurs, the mobile device sends position and time estimates, and a bump request to a server, and the fixed button sends its identification to the server. The server sends a message to the mobile device prompting the customer to enter an amount of money to be sent to the retail shop. Thus, the bump button helps the server match the customer and the retail shop and initiate an electronic payment.

In another example, a bump button is located at an information kiosk in a train station. A traveler bumps the button with his mobile device. When the bump occurs, the mobile device sends position and time estimates, and a bump request to a server, and the fixed button sends its identification to the server. The server sends a message to the mobile device that directs the device to display travel information to the traveler. The message might be the uniform resource locator for a train timetable web page, for example. Thus, the bump button helps the server match the traveler with information relevant to the traveler's current position.

In another example, a bump button is located at a fan club booth at a musical concert. When a music fan attending the concert bumps the button with her smart phone or other mobile device, the device sends position and time estimates, and a bump request to a server, and the fixed button sends its identification to the server. The server sends the fan's email address to a band playing in the concert or registers the fan as a "friend" of the band in a social network, as examples. Thus, the bump button helps the server match the fan with the band.

In another example, a person using a computer needs to enter identifying information (e.g. user name, password, personal identification number, encryption key, etc.) to access a web site or other online resource. The web site displays a message: "bump now". The person bumps his mobile device against any of the keys on the computer's keyboard. The device sends position and time estimates, and a bump request to a server. The web site also reports the bump to the server. The server may then send identifying information to the web site on behalf of the person using the computer thus saving him from a tedious login process.

In another example, a sports fan is using a touch screen input device at stadium to buy beer from a vending machine. The fan bumps his mobile devices against the touch screen to initiate payment (as described above) and also to send an encrypted identification key that identifies him as someone old enough to buy beer. The bump button helps the server match the fan with the beer vendor and allows the vendor to offer additional services to the fan.

Figure 2:
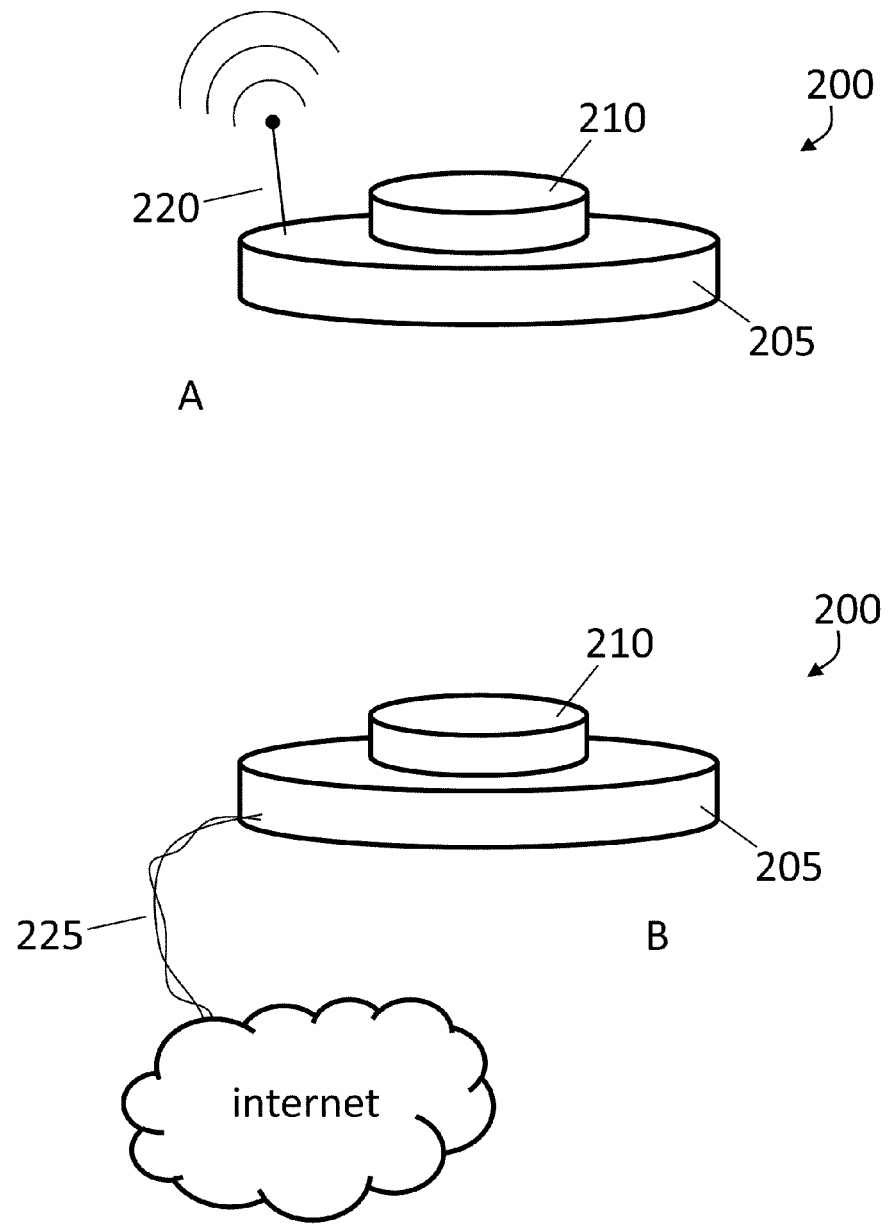
FIG. 2A shows a bump button communicating with the internet via a wireless connection.
FIG. 2B shows a bump button communicating with the internet via a wired connection.
Figure 3:
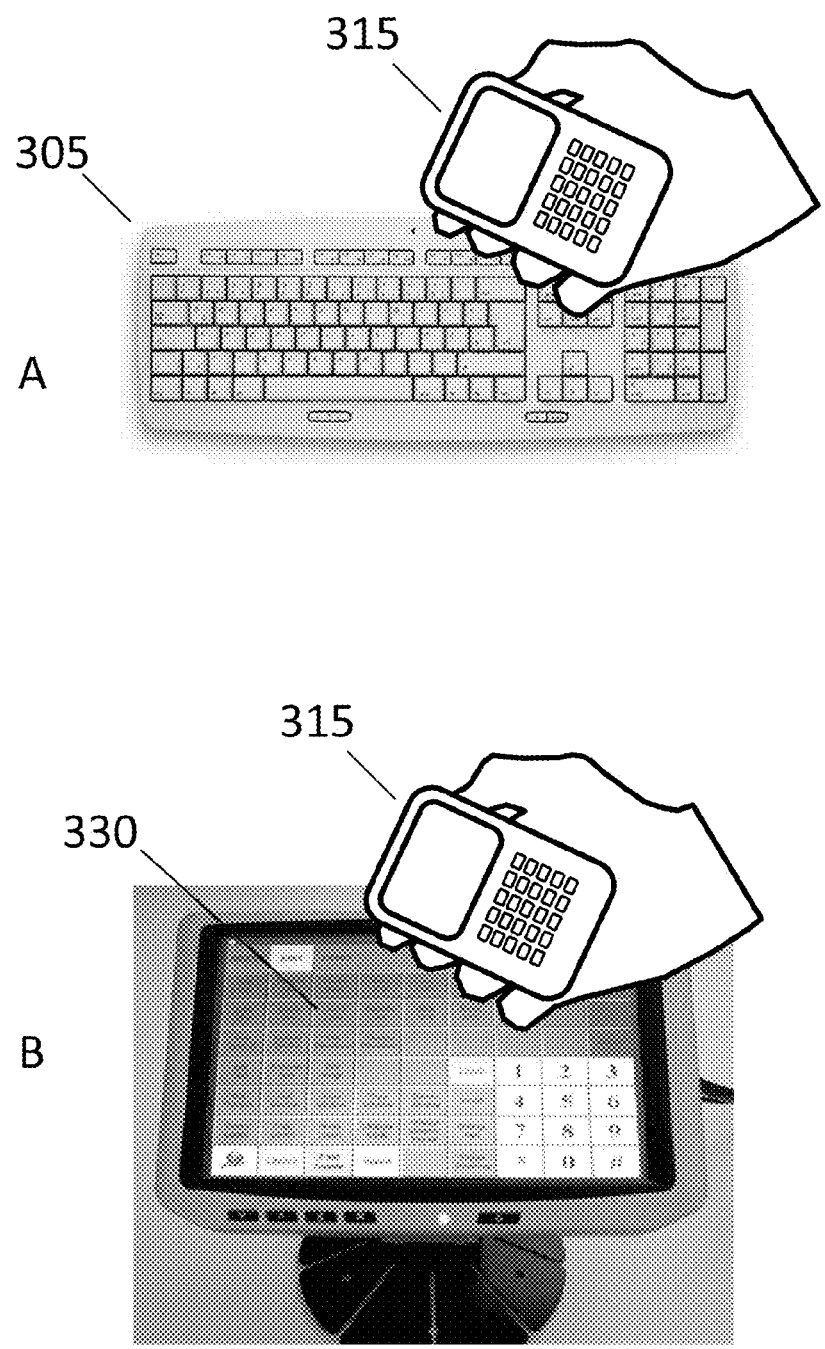
FIG. 3A shows a mobile device bumping a keyboard.
FIG. 3B shows a mobile device bumping a touch screen.

Many alternatives devices to the buttons depicted in FIGS. 1 and 2 are possible. For example, FIG. 3A shows a mobile device 315 bumping a keyboard 305 while FIG. 3B shows the device bumping a touch screen 330. The keyboard or touch screen is connected to a processor, memory and network connection so that it can transmit bump information to a server. A fixed bump device may also use a computer mouse button, camera, microphone or radio receiver, as examples, to detect the presence of a mobile device.

In dense user environments a bump button may emit a short-range beacon signal to help a mobile device improve its position estimate. For example, a bump button may emit a coded audio signal. A mobile device may use its microphone to record part of the audio signal. The audio recording may then be interpreted by the mobile device or sent to a server for further processing. A bump button may instead (or also) emit a radio or optical signal as a beacon. Further the beacon may be continuous or may be turned on briefly when a bump occurs. In either case, receipt of a beacon signal by a mobile device during a bump provides another way to validate the bump in the presence of multiple nearby mobile devices.

Figure 4:
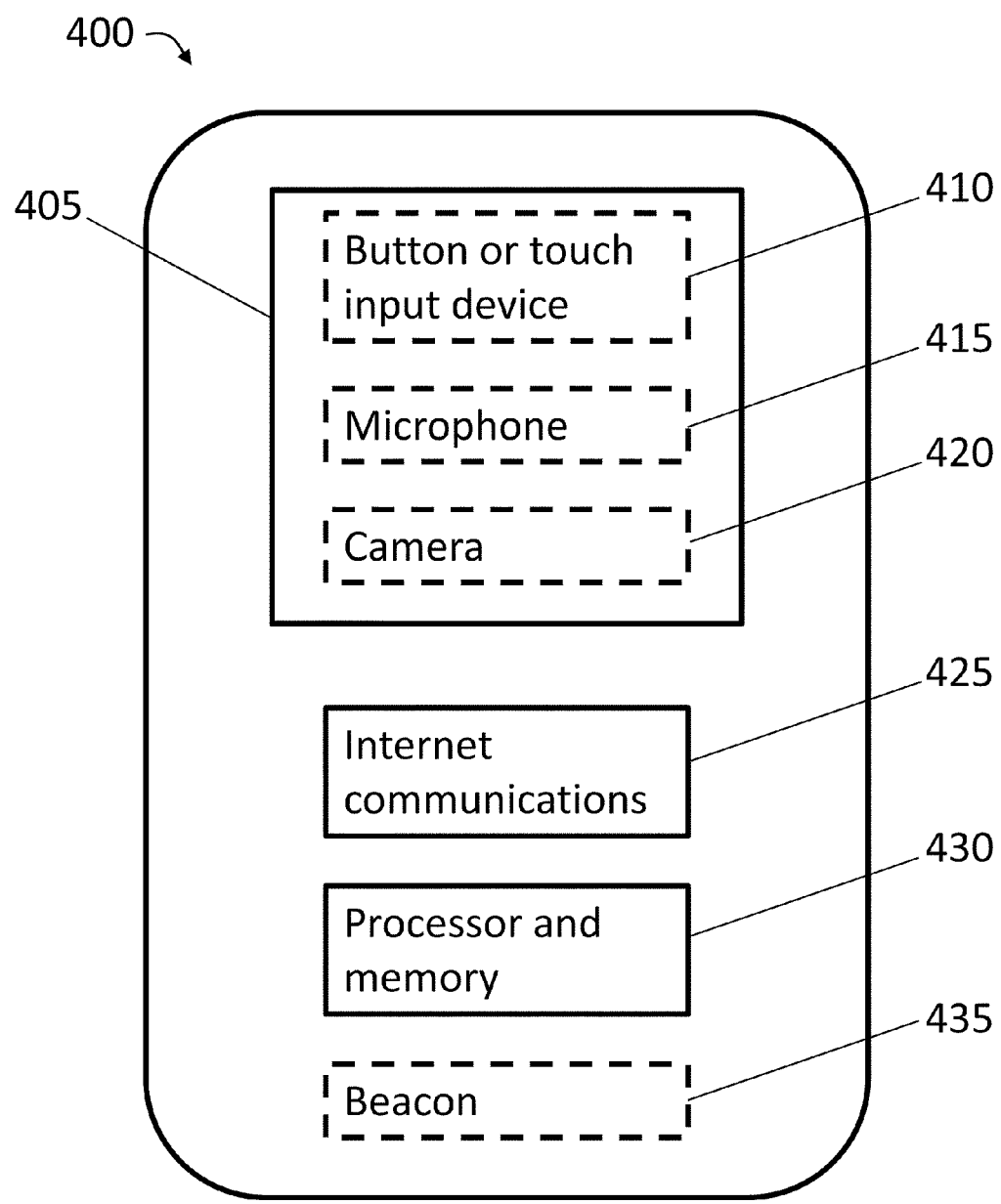
FIG. 4 is a schematic block diagram of a bump button that may connect to the internet.

A bump button may be implemented in many different forms as described above. In one configuration, each of these share basic components as outlined in FIG. 4 which is a schematic block diagram of a bump button. In FIG. 4, fixed bump device ("button") 400 includes an input sensor 405, an internet communications unit 425, a processor and memory 430, and an optional beacon 435. Input sensor 405 may be a button or touch input device (e.g. touch screen) 410, a microphone 415 that listens for characteristic sounds (e.g. thuds, impacts) of a bump, a camera 420 that recognizes a picture (e.g. barcode) displayed by a mobile device, a radio receiver or another sensor. A fixed device supported by a spring may include an accelerometer as a sensor. A computer keyboard operating as a fixed bump device may use its keys to sense a bump.

In a basic form, a bump button has only one capability: when its sensor is triggered, it sends a message stored in memory to a server via the internet. The memory may be read-only memory as the message need only identify the bump button. The button's fixed location is already known to the server. Thus, a button's processor does not perform any general purpose computer function other than sending the message stored in the read-only memory If a button also contains a clock, then the server may determine the button's clock offset as described in U.S. patent application Ser. No. 12/699,692, "Bump validation", filed on 3 Feb. 2010 and incorporated herein by reference. However, time reporting ability is not required in basic bump button implementations. A bump button's optional beacon may emit audio, radio and/or optical signals. The signals may be continuous tones or may contain coded information. Finally, the beacon signals may be emitted continuously or briefly (e.g. a few seconds) when a bump occurs.

Figure 5:
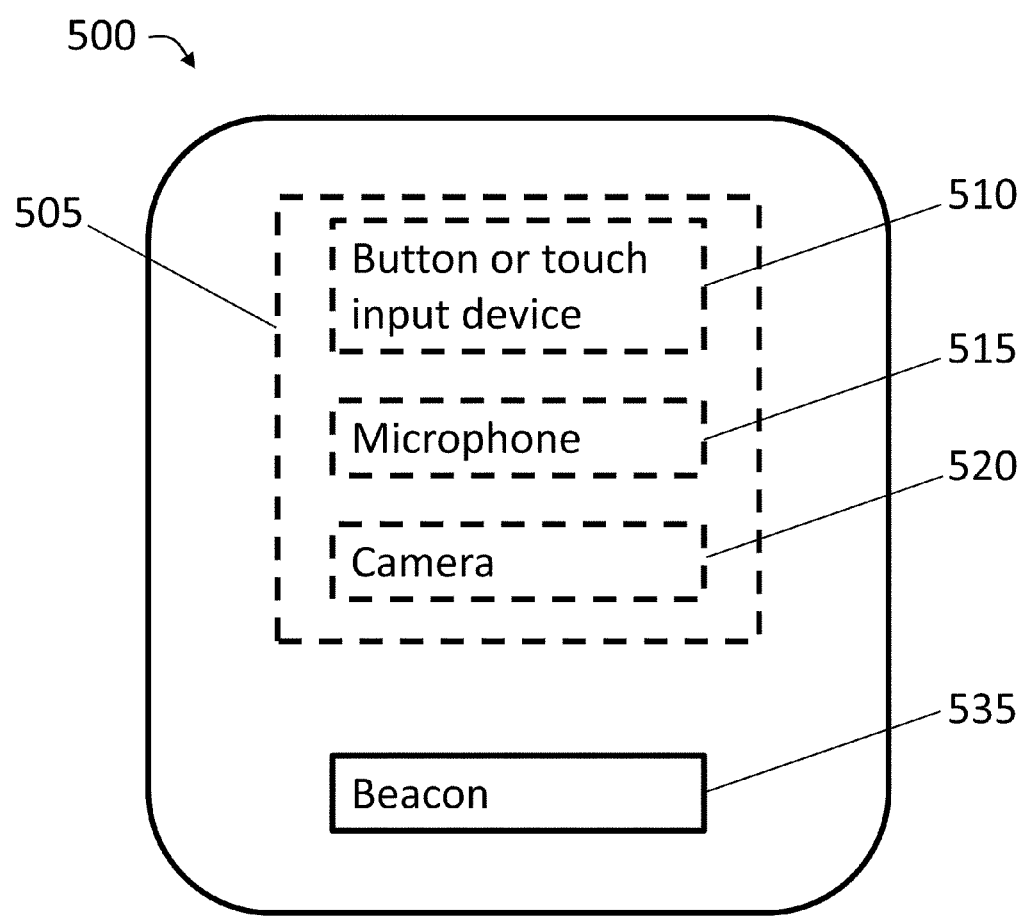
FIG. 5 is a schematic block diagram of a bump button that does not connect to the internet.

In another configuration, a fixed bump button does not include a system for communicating with the internet. FIG. 5 is a schematic block diagram of a bump button that does not connect to the internet, for example. In FIG. 5, fixed bump device ("button") 500 includes an optional input sensor 505 and a beacon 535. Input sensor 505 may be a button or other touch input device (e.g. touch screen) 510, a microphone 515 that listens for characteristic sounds (e.g. thuds, impacts) of a bump, a camera 520 that recognizes a picture (e.g. barcode) displayed by a mobile device, a radio receiver, a motion sensor such as an accelerometer or gyroscope, or another sensor. A fixed device supported by a spring may include an accelerometer as a sensor.

If a bump button constructed according to FIG. 5 has an input sensor, then the button may activate its beacon when its sensor is triggered. If the button does not have an input sensor, then the button's function is simply to emit its beacon signal continuously or at set repetition intervals. The bump button's beacon may emit audio, radio and/or optical signals. These beacon signals may be continuous tones or may contain coded information. An example of a radio beacon signal is a Wi-Fi broadcast of a button's MAC (media access control) address. Finally, the beacon signals may be emitted continuously or briefly (e.g. a few seconds) when a bump occurs.

A bump button that has no internet communication ability still adds information when a mobile device bumps it. When a mobile device bumps a beacon-only button, the mobile device reports the beacon signal, and thus the button's identity, to a server. The button's fixed location is already known to the server, so the location of the mobile device is known with improved accuracy compared to a case where no button is present.

Fixed bump buttons as described herein facilitate matching mobile device users with specific locations such as retail shops, information kiosks or vending machines. When mobile and fixed devices are matched in a bump, information transfers between the mobile device and a server can carry money, identification or other information. Fixed bump buttons in different forms may include internet connection ability and/or emit beacon signals.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A system comprising:
   a fixed device in a known location, the device comprising:
   an input button that creates a signal when it is bumped by a mobile device; an internet connection; and, a processor in communication with the input button, the internet connection and a read-only memory; wherein the processor, upon receiving the signal, retrieves a first message from the read-only memory and sends the first message via the internet connection; and,
   a server that communicates via internet; wherein the server, upon receiving a position estimate, a time estimate and a bump request from a mobile device, and the first message from the fixed device, matches the mobile device with the known location of the fixed device and sends a second message to the mobile device.

2. The system of claim 1, the known location being at a cash register of a retail store, and the second message pertaining to electronic payments from a user of the mobile device to the retail store.

3. The system of claim 1, the known location being at a fan club booth, and the second message pertaining to a social network relationship between a user of the mobile device and a performer.

4. The system of claim 1, the known location being that of a beer vending machine, and the second message pertaining to encrypted identification of a user of the mobile device verifying the user as being old enough to buy beer.

5. The system of claim 1, the internet connection being a wireless internet connection.

6. The system of claim 1, the fixed device further emitting a short-range beacon signal to help the mobile device improve the position estimate.

7. The system of claim 6, the beacon signal being a coded audio signal.

8. The system of claim 7, the server further receiving a recording of the coded audio signal from the mobile device.

9. The system of claim 6, the beacon signal being a radio signal.

10. The system of claim 6, the beacon signal being an optical signal.

\* \* \* \* \*